(12) United States Patent
Tamamura et al.

(10) Patent No.: US 7,191,944 B2
(45) Date of Patent: Mar. 20, 2007

(54) DRIVE MECHANISM FOR IMAGE SCANNER APPARATUS

(75) Inventors: Katsuki Tamamura, Shizuoka (JP); Toru Uchida, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/028,696

(22) Filed: Jan. 4, 2005

(65) Prior Publication Data

US 2005/0145697 A1   Jul. 7, 2005

(30) Foreign Application Priority Data

Jan. 6, 2004   (JP)   ............................. 2004-001460

(51) Int. Cl.
G06K 7/10   (2006.01)
(52) U.S. Cl. ..................... 235/454; 235/444
(58) Field of Classification Search ................ 235/444, 235/454, 483, 484
See application file for complete search history.

(56) References Cited

U.S. PATENT DOCUMENTS

| | | | | |
|---|---|---|---|---|
| 4,500,197 A | * | 2/1985 | Dannatt | 399/211 |
| 4,728,988 A | * | 3/1988 | Tsutsui et al. | 399/212 |
| 4,931,836 A | * | 6/1990 | Matsushita et al. | 399/212 |
| 5,012,353 A | * | 4/1991 | Yoshino et al. | 358/401 |
| 5,069,537 A | * | 12/1991 | Kitagishi | 359/557 |
| 5,285,294 A | * | 2/1994 | Takeuchi | 358/474 |
| 5,467,328 A | * | 11/1995 | Murakami et al. | 359/814 |
| 5,970,288 A | * | 10/1999 | Nanba et al. | 399/211 |
| 6,108,505 A | * | 8/2000 | Hayashi | 399/206 |
| 6,246,492 B1 | * | 6/2001 | Chang et al. | 358/497 |
| 6,335,802 B1 | * | 1/2002 | Hung-Che et al. | 358/296 |
| 6,381,041 B1 | * | 4/2002 | Hayashi et al. | 358/474 |
| 6,618,554 B1 | * | 9/2003 | Jinbo et al. | 388/849 |
| 6,631,014 B1 | * | 10/2003 | Aoshima et al. | 358/497 |
| 6,830,312 B2 | * | 12/2004 | Muramatsu et al. | 355/55 |

FOREIGN PATENT DOCUMENTS

| | | |
|---|---|---|
| JP | 4-336855 | 11/1992 |
| JP | 8-137018 | 5/1996 |
| JP | 11-184019 | 7/1999 |
| JP | 11-284806 | 10/1999 |
| JP | 2001-223843 | 8/2001 |

* cited by examiner

*Primary Examiner*—Uyen-Chau N. Le
(74) *Attorney, Agent, or Firm*—Scully, Scott, Murphy & Presser, P.C.

(57) ABSTRACT

An image scanner apparatus is composed of a housing, an optical unit positioned in the housing, a drive mechanism driving the optical unit. The drive mechanism includes first and second wires connected to the optical unit, and a drive motor driving the first and second wires. One end of the first wire is connected to a first fixture, and one end of the second wire is connected to a second fixture. The first fixture is secured to a first wire-retaining member positioned outside the housing at a first securing position, and the first wire-retaining member retains the first fixture so that the first securing position is adjustable.

10 Claims, 8 Drawing Sheets

DRIVE MECHANISM FOR IMAGE SCANNER APPARATUS

BACKGROUND OF THE INVENTION

1. Field of the Invention

The present invention relates to image scanner apparatuses, and more particularly to drive mechanisms of image scanner apparatuses for achieving improved alignment of optical units used for image scanning.

2. Description of the Related Art

Image scanner apparatuses, including facsimile machines and copier machines, often achieve image scanning of a document placed on a glass platen through reciprocating an optical unit below the glass platen with a wire drive mechanism. In an exemplary image scanner configuration, one or more wires are used to feed drive force from a drive motor to the optical unit. The wires are routed around pulleys disposed within the optical unit, and the ends of the wires are secured on a housing of the image scanner apparatus.

When image scanning is started, the optical unit is required to be placed so that imaging devices disposed within the optical unit are aligned with the document placement baseline defined on the glass platen; however, the image captured through the image scanning often experiences misalignment on the end of the document, or undesirable tilt, due to the misalignment of the optical unit. Avoiding undesirable misalignment and tilt of the image requires proper alignment of the optical unit.

A conventional method for achieving alignment of the optical unit involves adjusting the securing position of the wire to the optical unit, or adjusting the securing position of the end of the wire to the housing, after removing the glass platen.

However, removing the glass platen not only requires troublesome work, but also provides a possibility that dust is introduced into the optical unit; dust may cause undesirable black stripes within the captured image, when dust is adhered to the optical system within the optical unit.

More specifically, several methods for achieving alignment of the optical unit have been proposed.

Japanese Open Laid Patent Publication No. H04-336855 discloses a conventional drive mechanism for an image scanner apparatus, which is illustrated in FIG. 1. The conventional drive mechanism is composed of a support bracket 25 disposed outside of a frame of the scanner apparatus. The support bracket 25 is connected to a wire 30 through a spring 40. The wire 30 is guided by a resistive guide 20. This drive mechanism allows adjusting the wire tension without removing a glass platen.

However, the conventional drive mechanism shown in FIG. 1 also requires removing a document glass platen for aligning the optical unit, because the other end of the wire 30 is positioned in the housing.

Japanese Open Laid Patent Publication No. H11-184019 discloses an image scanner, which is illustrated in FIG. 2. The image scanner apparatus is composed of a skew adjusting plate 55 that provides easy position adjustment of an optical sensor.

The skew adjusting plate 55 is screwed after the position and angle thereof are adjusted along the directions denoted by arrows 56 and 57, for thereby adjusting the length of a wire 50. This allows a mirror table 58 to be placed at a desired position. The position adjustment of the optical sensor is achieved through appropriately placing the mirror table 58.

However, adjusting the position and angle of the skew adjusting plate 55 requires removing a document glass platen. Accordingly, the mechanism illustrated in FIG. 2 also requires troublesome work for adjusting the position of the optical unit, and does not eliminate the possibility that dust is introduced into the optical unit.

Japanese Open Laid Patent Application No. 2001-223843 discloses another image scanner for easily correcting image distortion. As shown in FIG. 3, this image scanner is composed of a wire 120 that allows position adjustment of a carriage 100 along a minor scan direction, denoted by a symbol "Y". The carriage 100 supports an image distortion-correcting mirror. Both ends of the wire 120 are secured to a wire holder member 130 that is movable along the minor scan direction.

However, the mechanism shown in FIG. 3 also requires removing a document glass plate for achieving alignment of an optical unit, because the wire holder member 130, to which the moving wire 120 is secured, is disposed inside of the housing unit of the image scanner.

Japanese Open Laid Patent Application No. H11-284806 discloses an image scanner apparatus with a wire drive mechanism that allows assembling wires to the wire drive mechanism before assembling guide rails into a housing. The wire drive mechanism also requires removing a glass platen for achieving alignment of an optical unit.

Finally, Japanese Open Laid Patent Application No. H08-137018 discloses another image scanner for easily assembling a wire into a wire drive mechanism. The image scanner disclosed in this document is composed of a pulley positioned outside a housing for routing the wire. However, this pulley does not provide adjustment of the position of an optical unit.

SUMMARY OF THE INVENTION

Therefore, an object of the present invention is to provide a drive mechanism for an image scanner apparatus in which alignment of an optical unit is easily achieved without removing a document glass platen.

In an aspect of the present invention, image scanner apparatus is composed of a housing, an optical unit positioned in the housing, a drive mechanism driving the optical unit. The drive mechanism includes first and second wires connected to the optical unit, and a drive motor driving the first and second wires. One end of the first wire is connected to a first fixture, and one end of the second wire is connected to a second fixture. The first fixture is secured to a first wire-retaining member positioned outside the housing at a first securing position, and the first wire-retaining member retains the first fixture so that the first securing position is adjustable.

Preferably, the second fixture is secured to a second wire-retaining member positioned outside the housing at a second securing position, and the second wire retaining member retains the second fixture so that the second securing position is adjustable.

It is also preferable that another end of the first wire is connected to a third fixture, and the third fixture is secured to a third wire retaining member positioned outside the housing at a third securing position, the third wire retaining member retaining the third fixture so that the third securing position is adjustable.

In a preferred embodiment, the first fixture includes a crimp terminal connected to the one end of the first wire, a slotted bracket provided with a slot, and a spring connected between the crimp terminal and the slotted bracket. The slotted bracket is screwed to the first wire-retaining member.

In another aspect of the present invention, a method is provided for appropriately operating the image scanner apparatus thus constructed. The method includes a step of positioning the optical unit through adjusting a securing position of the first fixture.

Preferably, the positioning step includes a step of adjusting a securing position of the second fixture.

When another end of the first wire is connected to a third fixture positioned outside the housing, the step of positioning preferably includes a step of adjusting a securing position of the third fixture.

In this case, it is further preferable that another end of the second wire is connected to a fourth fixture positioned outside the housing, and the step of positioning includes a step of adjusting securing positions of the second and fourth fixtures.

The step of positioning is performed so that the optical unit is aligned with respect to a document placement baseline.

When the first fixture includes a crimp terminal connected to the one end of the first wire, a slotted bracket provided with a slot, and a spring connected between the crimp terminal and the slotted bracket, the step of positioning preferably includes a step of connecting the slotted bracket with a screw at a desired position of the slot.

DESCRIPTION OF THE PREFERRED EMBODIMENTS

Embodiments of the present invention will be described in detail below with reference to the accompanying drawings.

Figure 1:
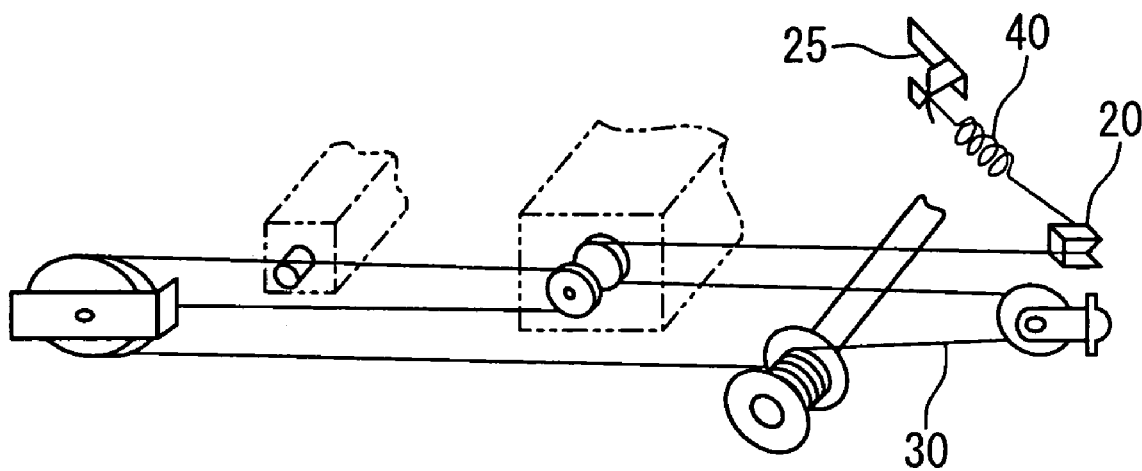
FIG. 1 is a perspective view depicting the structure of a conventional drive mechanism for an image scanner.
Figure 2:
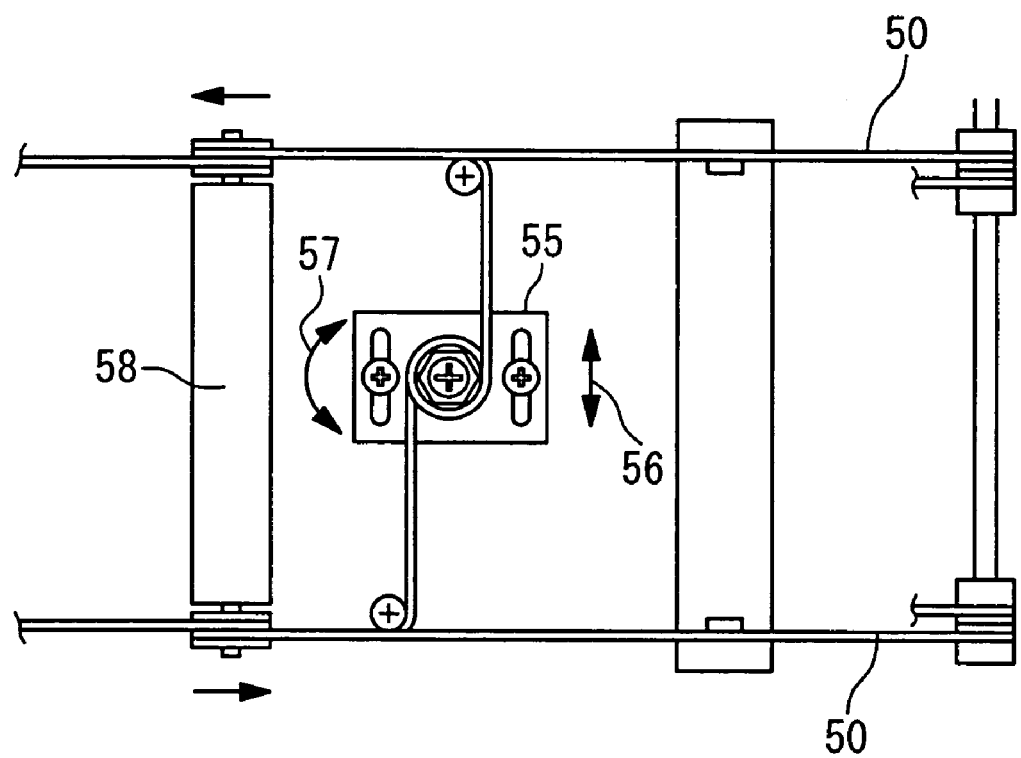
FIG. 2 is a configuration view depicting the structure of another conventional drive.
Figure 2:
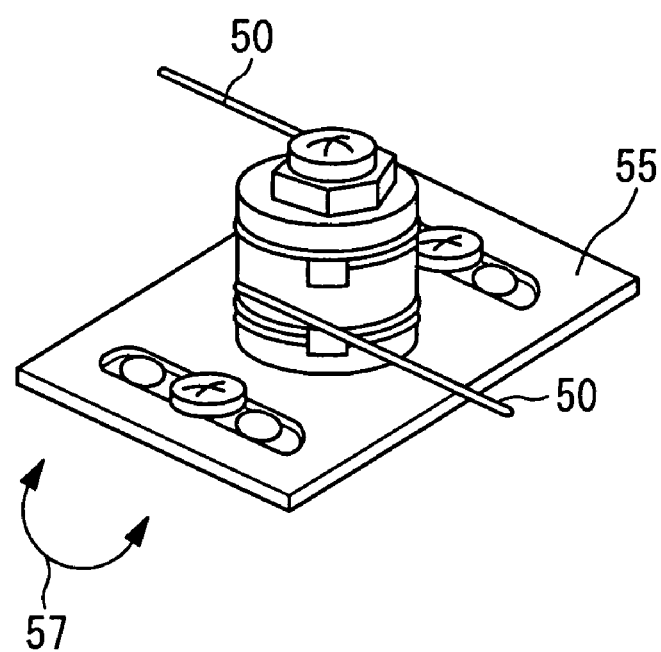
Figure 3:
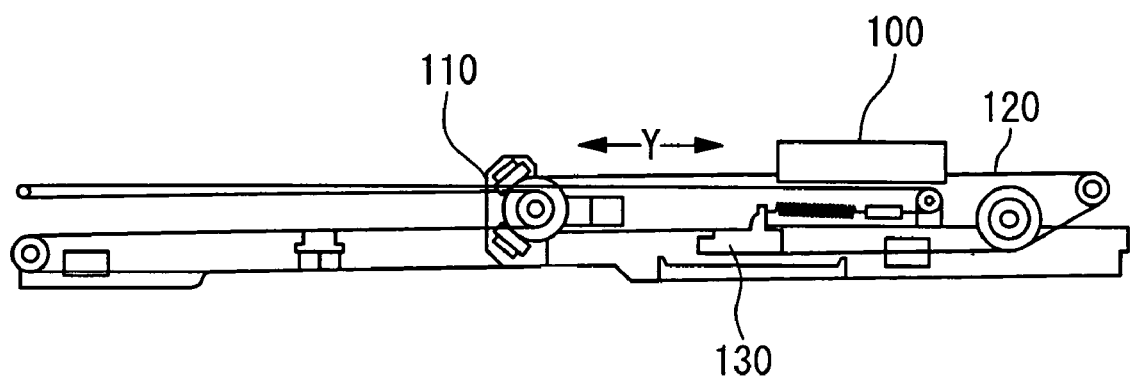
FIG. 3 is a perspective view depicting the structure of still another conventional drive mechanism.
Figure 3:
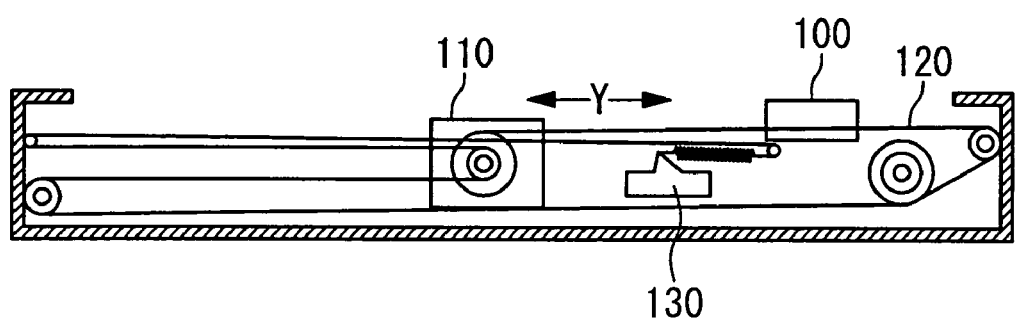
Figure 4:
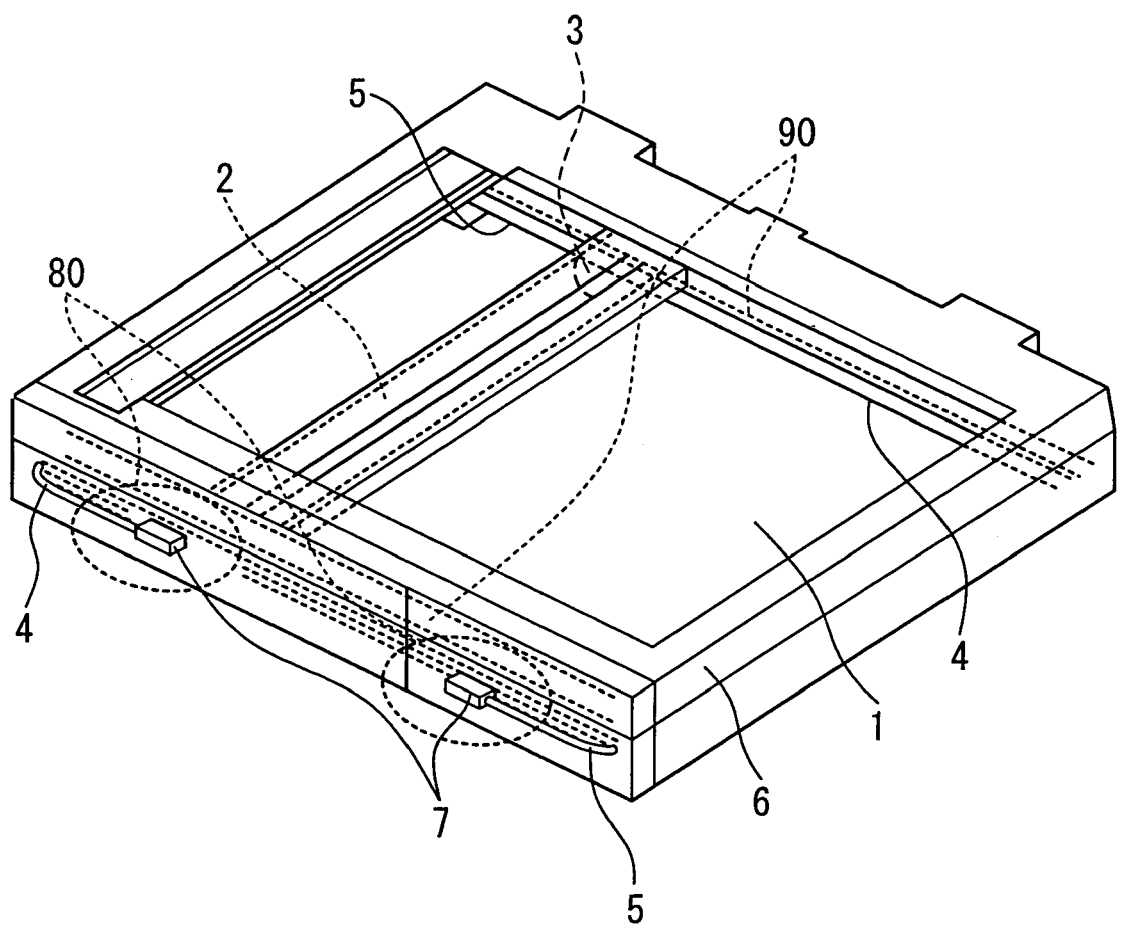
FIG. 4 is a view depicting a schematic configuration of an image scanner apparatus in one embodiment of the present invention.

FIG. 4 schematically illustrates an exemplary structure of an image scanner apparatus in one embodiment of the present invention. The image scanner apparatus of the present invention is composed of: an image-reading optical unit 2; a drive mechanism for driving the optical unit 2; a housing 6 accommodating the optical unit 2 and the drive mechanism; and a glass platen 1 on which a document is placed. The optical unit 2 includes an imaging device (not shown), such as a CCD, and a drive motor 3. The optical unit 2 is movable along the scan directions under the document glass platen 1. When a document placed on the glass plate 1 is scanned, the optical unit 2 is reciprocated along the scan directions below the glass platen 1.

Figure 5:
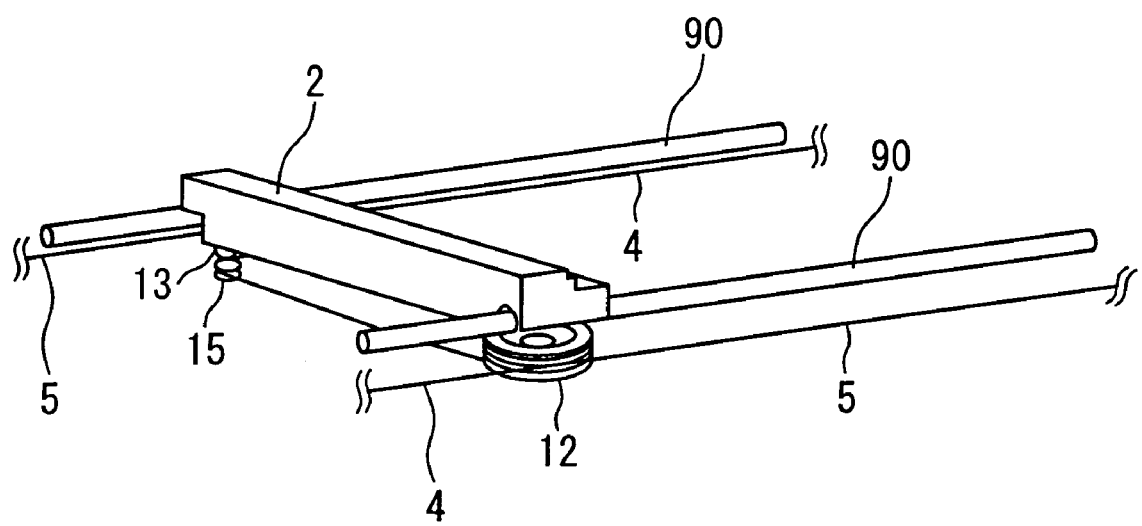
FIG. 5 is a view depicting a detailed structure of an optical unit.

FIG. 5 shows an exemplary arrangement of the drive mechanism for driving the optical unit 2 in the housing 6. Both ends of the optical unit 2 are mounted on guide members 90 disposed in the housing 6. The guide members 90 guide the optical unit 2 along the scan directions.

The optical unit 2 is provided with a drum 12 connected to the drive motor 3 and a set of pulleys 13 to 15; the drum 12 and the pulleys 13 to 15 are used to reciprocate the optical unit 2 along the scan directions. Wires 4 and 5 are routed around the drum 12 and the pulleys 13 to 15. Driving the drum 12 with the drive motor 3 allows the optical unit 2 to reciprocate along the scan directions with the wires 4 and 5.

Figure 6:
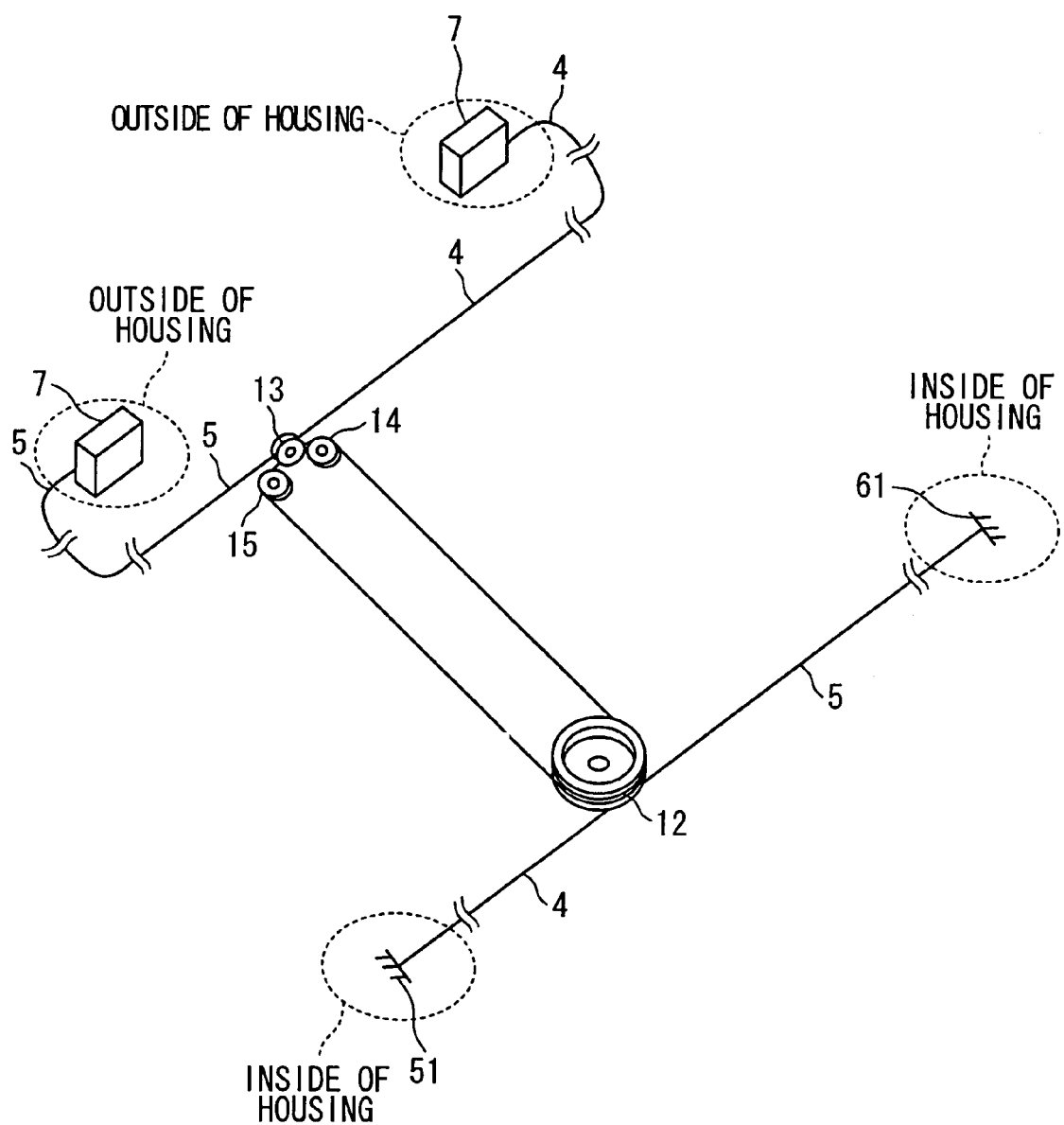
FIG. 6 is a view depicting an exemplary wire layout within the image scanner apparatus in this embodiment.

FIG. 6 shows a detailed layout of the wires 4 and 5 in the housing 6. It should be noted that the optical unit 2 is not shown in the FIG. 6 for simplicity. One end of the wire 4 is secured to a retaining member 51 disposed in the housing 6. The wire 4 is routed around the drum 12 and the pulleys 14 and 13, and the other end of the wire 4 is secured to a wire-retaining member 7 disposed outside the housing 6. Correspondingly, one end of the wire 5 is secured to another retaining member 61 disposed in the housing 6. The wire 5 is routed around the drum 12 and the pulleys 15 and 13, and the other end of the wire 5 is secured to another wire-retaining member 7 disposed outside the housing 6.

Figure 8:
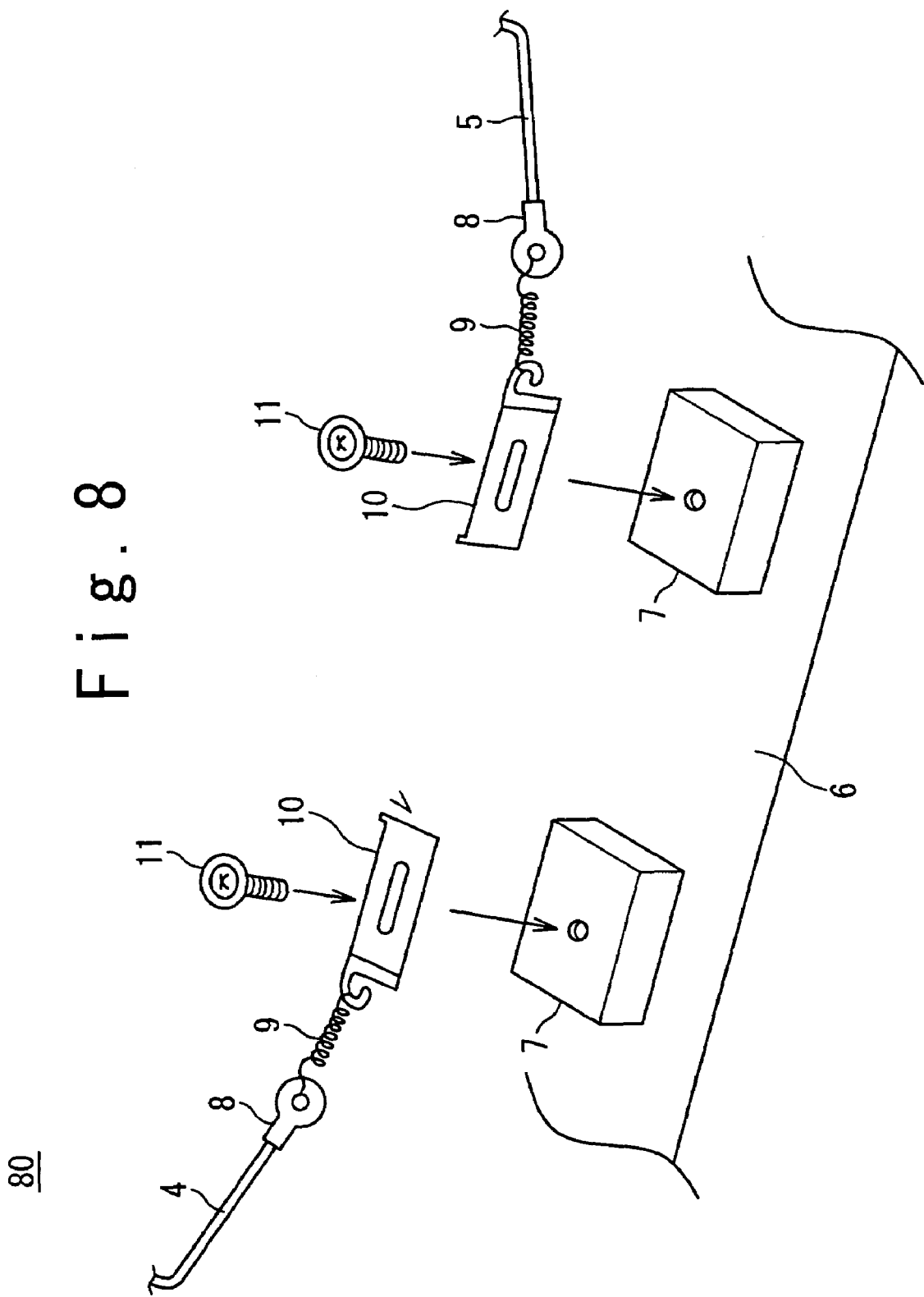
FIG. 8 is a detailed view showing wire-securing portions of the image scanner apparatus in one embodiment of the present invention.

FIG. 8 shows a detailed structure 80 used for securing the ends of the wires 4 and 5 to the wire-retaining members 7. Fixtures are disposed on the respective ends of the wires 4 and 5, each fixture being composed of a crimp terminal 8, a spring 9, and slotted brackets 10. The fixtures are respectively secured to the wire-retaining members 7 so that the securing positions of the fixtures are adjustable. Specifically, the crimp terminals 8 are individually connected to the ends of the wires 4 and 5 through pressure, and are individually hooked on the slotted brackets 10 through the springs 9. The slotted brackets 10 are secured with screws to the wire-retaining members 7. Slots disposed through the slotted brackets 10 allow adjustably securing the slotted brackets 10 to the wire-retaining members 7.

The springs 9 provides appropriate adjustment of the wire tensions of the wires 4 and 5, so that the wire tensions are uniform. The uniformed wire tensions effectively avoid image-scan velocity fluctuation resulting from fluctuation in load applied to the optical unit 2.

As described above, the initial position of the optical unit 2 needs to be aligned with the document placement baseline within tolerances required by the specification. In order to achieve the alignment of the optical unit 2, the securing positions of the ends of the wires 4 and 5 are required to be appropriately adjusted; inappropriate adjustment of the positions of the ends of the wires 4 and 5 may cause unbalance of the optical unit 2, and undesirable tilt of the captured image.

The following is an explanation of an exemplary method for achieving alignment of the optical unit 2. The alignment of the optical unit 2 is achieved by screwing the slotted brackets 10 to the wire-retaining members 7, positioned outside the housing 6, at appropriate positions. Shifting the screwing positions of the slotted brackets 10 causes the shift of the ends of the optical unit 2; the shift distances of the ends of the optical unit 2 are proportional to those of the ends of the wires 4 and 5, connected to the slotted brackets 10.

It should be noted that this adjusting process does not require removing the glass platen 1 from the housing 6, because the ends of the wires 4 and 5, that is, the wire-retaining members 7 are positioned outside the housing 6. This allows easily achieving the alignment of the optical unit 2.

The elimination of the need for removing the glass platen 1 is also effective for avoiding dust being undesirably introduced into the optical unit 2. This eliminates the problem that black strips may undesirably appear in the captured image.

Figure 7:
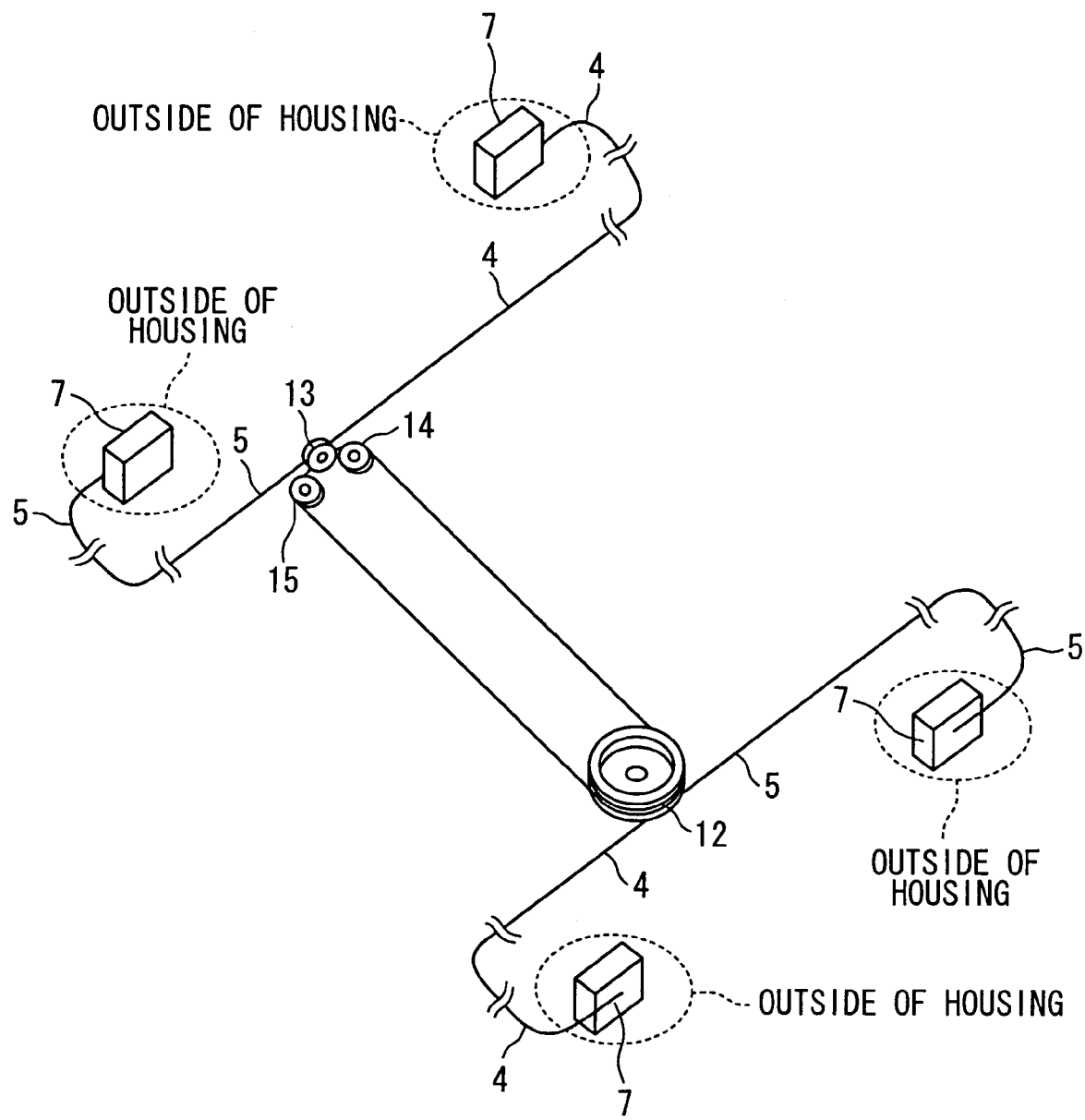
FIG. 7 is a view depicting an exemplary wire layout within the image scanner apparatus in an alternative embodiment of the present invention.

In an alternative embodiment, as illustrated in FIG. 7, both ends of each of the wires 4 and 5 are positioned outside the housing 6. Specifically, both ends of each of the wires 4 and 5 are respectively connected to fixtures, and the fixtures are respectively connected to wire-retaining members 7 positioned outside the housing 6, so that both ends of each of the wires 4 and 5 are movably supported through springs 9 and slotted brackets 10. This structure not only eliminates the need for removing the glass platen 1 before aligning the optical unit 2, but also effectively improves easiness of the position adjustment of the optical unit 2; the structure shown in FIG. 7 provides four adjustor mechanisms on all of the four ends of the wires 4 and 5, positioned outside the housing unit 6. Accordingly, this provides improved flexibility in adjusting the position of the optical unit 2 along the scan directions, and thus facilitates the correction of the misalignment on the end of the image.

Although the invent ion has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. An optical scanner apparatus comprising:
   a housing;
   an optical unit including an imaging device, said optical unit being positioned in said housing; and
   a drive mechanism driving said optical unit including:
      a first wire connected to said optical unit, one end of which is connected to a first fixture,
      a second wire connected to said optical unit, one end of which is connected to a second fixture,
      a drive motor driving a drive drum about which each of said first and second wires is routed,
      wherein said first fixture is secured to a first wire retaining member positioned outside said housing at a first securing position, and said first wire retaining member retains said first fixture so that said first securing position is adjustable and configured to proportionately align the optical unit while minimizing image-scan velocity fluctuations resulting from applied load fluctuations.

2. The image scanner apparatus according to claim 1, wherein said second fixture is secured to a second wire retaining member positioned outside said housing at a second securing position, and said second wire retaining member retains said second fixture so that said second securing position is adjustable.

3. The image scanner apparatus according to claim 1, wherein another end of said first wire is connected to a third fixture, and wherein said third fixture is secured to a third wire retaining member positioned outside said housing at a third securing position, and said third wire retaining member retains said third fixture so that said third securing position is adjustable.

4. The image scanner apparatus according to claim 1, wherein said first fixture includes:
   a crimp terminal connected to said one end of said first wire,
   a slotted bracket provided with a slot, and
   a spring connected between said crimp terminal and said slotted bracket, and
   wherein said slotted bracket is screwed to said first wire retaining member.

5. A method for operating an image scanner apparatus including:
   a housing, an optical unit including an imaging device, and a drive mechanism, said optical unit being positioned in said housing, said drive mechanism comprising:
      a first wire connected to said optical unit, one end of which is connected to a first fixture positioned outside said housing, a second wire connected to said optical unit, one end of which is connected to a second fixture positioned outside said housing, and a drive motor driving a drive drum about which each of said first and second wires is routed, said method comprising:
         positioning and aligning said optical unit proportionately through adjusting a securing position of said first fixture, while minimizing image-scan velocity fluctuations resulting from applied load fluctuations.

6. The method according to claim 5, wherein said positioning includes adjusting a securing position of said second fixture.

7. The method according to claim 5, wherein another end of said first wire is connected to a third fixture positioned outside said housing, and wherein said positioning includes adjusting a securing position of said third fixture.

8. The method according to claim 7, wherein another end of said second wire is connected to a fourth fixture positioned outside said housing, and wherein said positioning includes adjusting securing positions of said second and fourth fixtures.

9. The method according to claim 5, wherein said positioning is performed so that said optical unit is aligned with respect to a document placement baseline.

10. The method according to claim 5, wherein said first fixture includes:
   a crimp terminal connected to said one end of said first wire, a slotted bracket provided with a slot, and
   a spring connected between said crimp terminal and said slotted bracket, and wherein said positioning includes:
      connecting said slotted bracket with a screw at a desired position of said slot.

* * * * *